(12) United States Patent
Kim et al.

(10) Patent No.: US 10,684,504 B2
(45) Date of Patent: Jun. 16, 2020

(54) LIQUID CRYSTAL DISPLAY DEVICE

(71) Applicant: Samsung SDI Co., Ltd., Yongin-si, Gyeonggi-do (KR)

(72) Inventors: Jin Woo Kim, Suwon-si (KR); Yi Eun Kim, Suwon-si (KR); Min Jeong Park, Suwon-si (KR); Kwang Ho Shin, Suwon-si (KR); Ji Hyun Wi, Suwon-si (KR); Ji Hyun Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/329,141

(22) PCT Filed: Jun. 22, 2017

(86) PCT No.: PCT/KR2017/006583
§ 371 (c)(1),
(2) Date: Feb. 27, 2019

(87) PCT Pub. No.: WO2018/043891
PCT Pub. Date: Mar. 8, 2018

(65) Prior Publication Data
US 2019/0204677 A1    Jul. 4, 2019

(30) Foreign Application Priority Data
Aug. 29, 2016 (KR) .................. 10-2016-0110362

(51) Int. Cl.
*G02F 1/1335* (2006.01)
*B32B 27/36* (2006.01)
(Continued)

(52) U.S. Cl.
CPC ........ *G02F 1/133528* (2013.01); *B32B 27/36* (2013.01); *C09K 11/616* (2013.01);
(Continued)

(58) Field of Classification Search
None
See application file for complete search history.

(56) References Cited

U.S. PATENT DOCUMENTS

2014/0211310 A1* 7/2014 Kuroda ................ G02B 5/3083
                                                                  359/489.01
2015/0228869 A1* 8/2015 Yoo ........................ H01L 33/54
                                                                  362/97.3

FOREIGN PATENT DOCUMENTS

JP         2014-44387 A    3/2014
KR  10-2014-0147036 A    12/2014
(Continued)

OTHER PUBLICATIONS

Korean Office action in corresponding Korean Application No. 10-2016-0110362, Korean Office action dated Jan. 28, 2019 (5 pgs.).

*Primary Examiner* — James A Dudek
(74) *Attorney, Agent, or Firm* — Lewis Roca Rothgerber Christie LLP

(57) ABSTRACT

Provided is a liquid crystal display device comprising: a light source having a wide color reproduction range; a liquid crystal panel; and a polarizing plate arranged on the visible side of the liquid crystal panel, wherein the polarizing plate comprises a polarizer and a polarizer protecting film; the polarizer protecting film comprises a polyester base film having an in-plane phase difference of 8,000 nm or higher at a wavelength of 550 nm and a primer layer formed on at least one surface of the polyester base film; and a coating layer having a lower refractive index than the primer layer is additionally formed on a surface of the primer layer.

12 Claims, 3 Drawing Sheets

(51) Int. Cl.
 *G02F 1/13363* (2006.01)
 *C09K 11/61* (2006.01)
 *G02B 5/30* (2006.01)
(52) U.S. Cl.
 CPC ........... *G02B 5/305* (2013.01); *G02F 1/1335* (2013.01); *G02F 1/13363* (2013.01)

(56) References Cited

FOREIGN PATENT DOCUMENTS

| | | |
|---|---|---|
| KR | 10-2015-0003709 A | 1/2015 |
| KR | 10-2015-0027684 A | 3/2015 |
| KR | 10-2015-0037596 A | 4/2015 |
| KR | 10-2015-0094402 A | 8/2015 |
| KR | 10-2016-0011331 A | 2/2016 |

* cited by examiner

【FIG. 1】
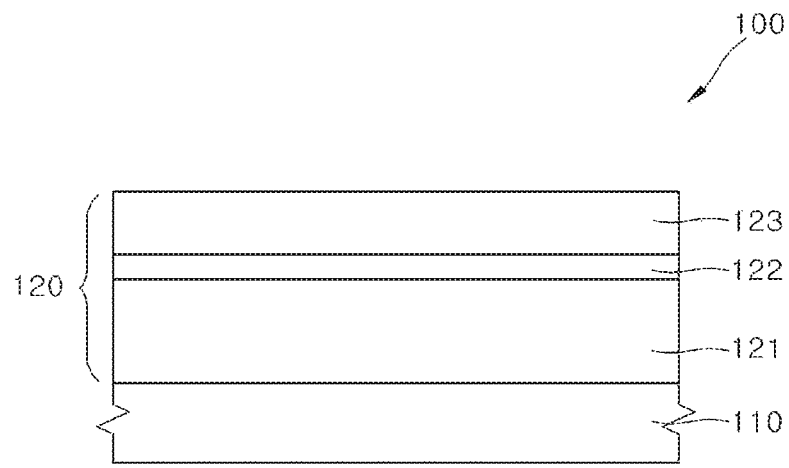
【FIG. 2】
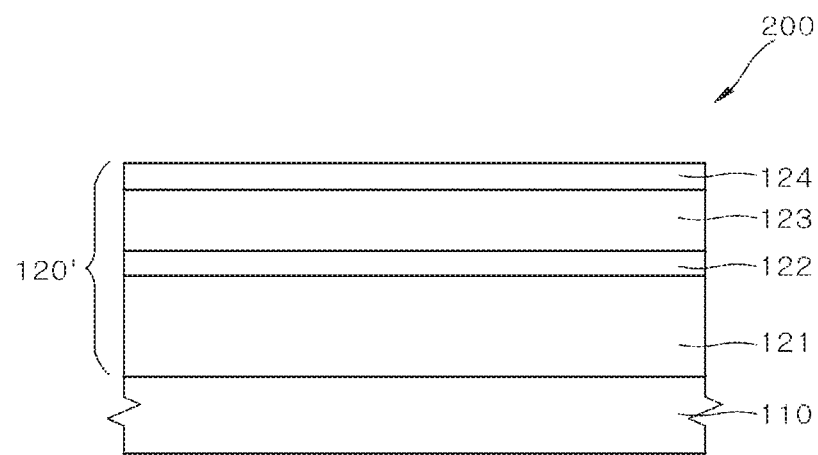

【FIG. 3】
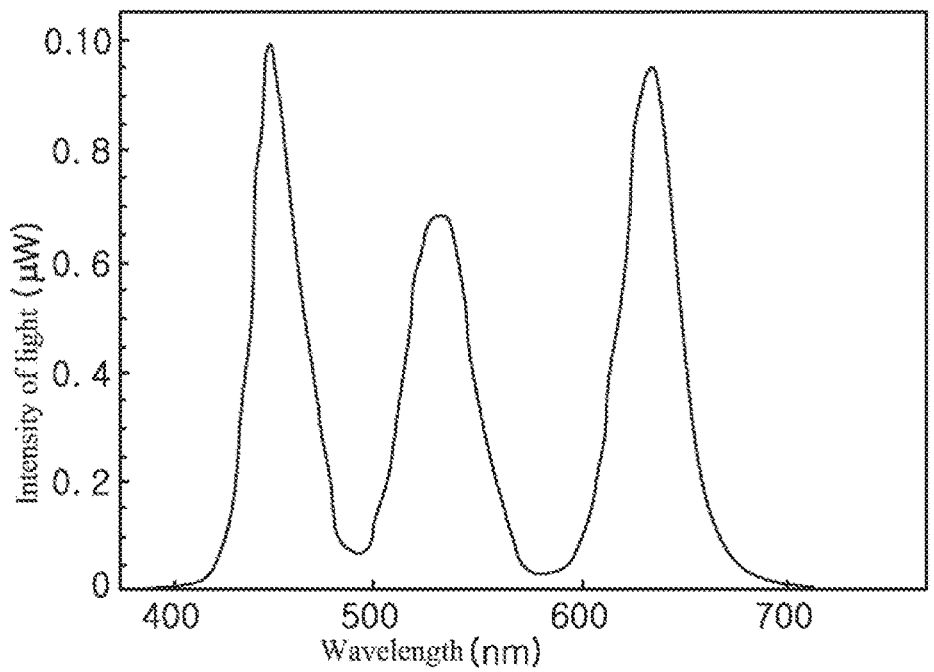
【FIG. 4】
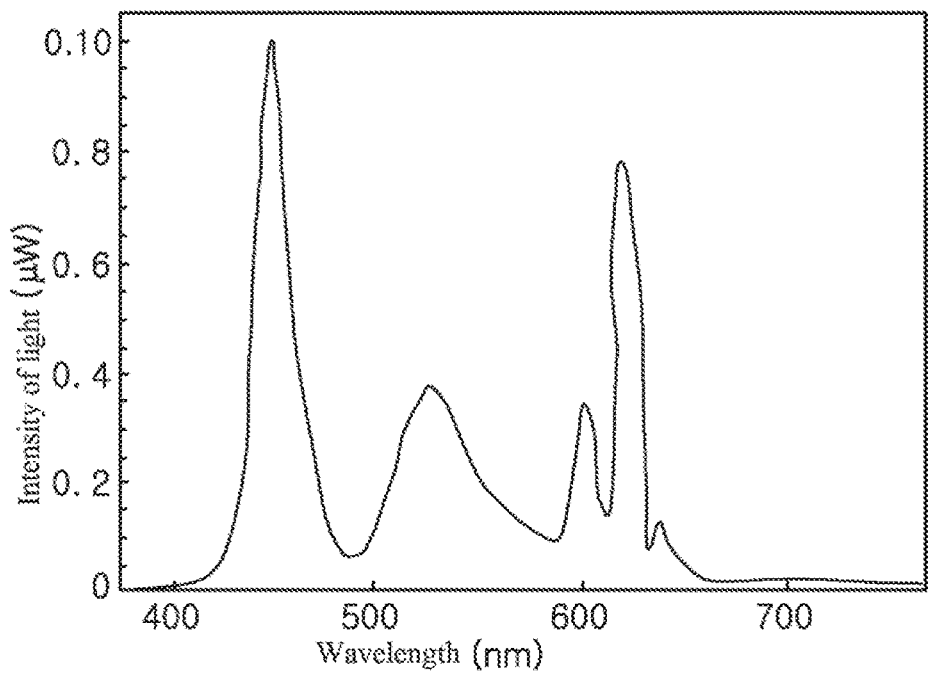

[FIG. 5]
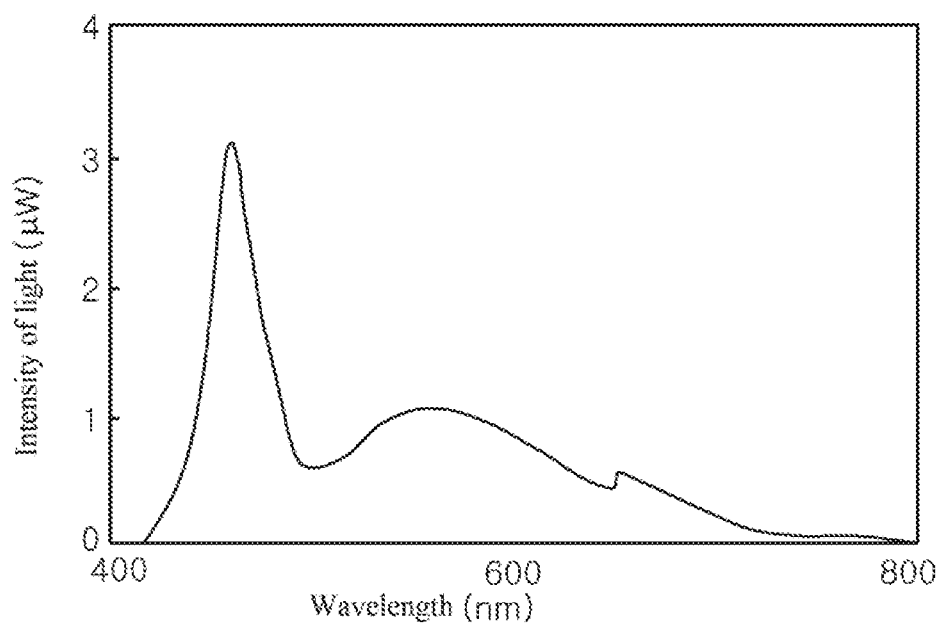

LIQUID CRYSTAL DISPLAY DEVICE

CROSS-REFERENCE TO RELATED APPLICATIONS

This application is a National Phase patent application and claims priority to and the benefit of International Application Number PCT/KR2017/006583, filed on Jun. 22, 2017, which claims priority to and the benefit of Korean Patent Application No. 10-2016-0110362, filed on Aug. 29, 2016, the entire contents of each of which are incorporated herein by reference.

FIELD

The present invention relates to a liquid crystal display device. More particularly, the present invention relates to a liquid crystal display device that employs a high color gamut light source and can prevent rainbow mura from being visible or can increase a side angle at which rainbow mura can first be viewed.

BACKGROUND

A liquid crystal display device essentially includes a polarizing plate, which is typically constituted of a polarizer and a protective film bonded to the polarizer. Typically, a triacetylcellulose film is used as the protective film for the polarizer. However, a thin triacetylcellulose film will provide insufficient mechanical strength and has high water permeability, causing deterioration of the polarizer. In addition, since the triacetylcellulose film is expensive, there is a need for inexpensive alternative materials.

A polyester film is more inexpensive and has higher mechanical strength than the triacetylcellulose film. However, when used as a protective film of the polarizer, the polyester film has a problem of rainbow mura due to birefringence thereof. Accordingly, the polyester film is stretched at high elongation to increase in-plane retardation in order to prevent the rainbow mura from being visible.

In recent years, in an attempt to improve image quality and light use efficiency, a light source having a high color gamut of about 95% or more by the NTSC (National Television System Committee) is used instead of a white light source having a color gamut of about 60% to about 70% (for example, YAG (yttrium aluminum garnet) phosphors included). However, when applied to a liquid crystal display device including such a high color gamut light source, the birefringent polyester film having high in-plane retardation allows the rainbow mura to be viewed and a typical polyester film having low in-plane retardation allows the rainbow mura to be severely viewed due to birefringence of the polyester film. Therefore, there is a need for a method for preventing the rainbow mura from being visible even in application of a high color gamut light source.

The background technique of the present invention is disclosed in Japanese Unexamined Patent Publication No. 2014-044387.

SUMMARY

It is an aspect of the present invention to provide a liquid crystal display device that employs a high color gamut light source and can prevent rainbow mura from being visible or can increase a side angle at which rainbow mura can first be viewed.

In accordance with one aspect of the present invention, a liquid crystal display device includes: a high color gamut light source; a liquid crystal panel; and a polarizing plate disposed at a viewer side of the liquid crystal panel, wherein the polarizing plate includes a polarizer and a polarizer protective film, the polarizer protective film including a polyester base film having an in-plane retardation of 8,000 nm or more at a wavelength of 550 nm; a primer layer formed on at least one surface of the polyester base film; and a coating layer formed on one surface of the primer layer and having a lower refractive index than the primer layer.

The present invention provides provide a liquid crystal display device that employs a high color gamut light source and can prevent rainbow mura from being visible or can increase a side angle at which rainbow mura can first be viewed.

BRIEF DESCRIPTION OF THE DRAWINGS

FIG. 1 is a sectional view of a polarizing plate according to one embodiment of the present invention.

FIG. 2 is a sectional view of a polarizing plate according to another embodiment of the present invention.

FIG. 3 is a graph depicting intensity of light depending upon wavelength of light emitted from a high color gamut light source according to one embodiment of the present invention.

FIG. 4 is a graph depicting intensity of light depending upon wavelength of light emitted from a high color gamut light source according to another embodiment of the present invention.

FIG. 5 is a graph depicting intensity of light depending upon wavelength of light emitted from a YAG phosphor-containing white light source in the related art.

DETAILED DESCRIPTION

Hereinafter, embodiments of the present invention will be described in detail with reference to the accompanying drawings such that the present invention can be easily implemented by a person having ordinary knowledge in the art. It should be understood that the present invention may be implemented in different ways and is not limited to the following embodiments. In the drawings, portions irrelevant to the description will be omitted for clarity. Like components will be denoted by like reference numerals throughout the specification.

As used herein, spatially relative terms such as "upper" and "lower" are defined with reference to the accompanying drawings. Thus, it will be understood that "upper" can be used interchangeably with "lower". It will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

Herein, "in-plane retardation (Re)" is represented by Equation 1, "out-of-plane retardation (Rth)" is represented by Equation 2, and "degree of biaxiality (NZ)" is represented by Equation 3.

$$Re = (n_x - n_y) \times d \qquad \text{<Equation 1>}$$

where $n_x$ and $n_y$ are the refractive indices of a polyester base film in the slow axis and fast axis directions thereof at a wavelength of 550 nm, respectively, and d is the thickness of the polyester base film (unit: nm).

$$Rth = ((n_x + n_y)/2 - n_z) \times d \qquad \text{<Equation 2>}$$

where nx, ny and nz are the refractive indices of a polyester base film in the slow axis, fast axis, and thickness directions thereof at a wavelength of about 550 nm respectively, and d is the thickness of the polyester base film (unit: nm).

$$NZ = (nx-nz)/(nx-ny) \qquad \text{<Equation 3>}$$

where nx, ny and nz are the refractive indices of a polyester base film in the slow axis, fast axis, and thickness directions thereof at a wavelength of about 550 nm, respectively.

Herein, the refractive index of each of a polyester base film, a primer layer, and a coating layer means a refractive index measured at a wavelength of 620 nm to 640 nm, preferably 630 nm to 640 nm, more preferably 633 nm, by a prism coupler method (Metricon 2010/M). In particular, since a liquid crystal display device according to the present invention employs a light source having a higher color gamut and different luminous peaks than a typical light source as shown in FIG. 3 to FIG. 4, and FIG. 5, the refractive index in this wavelength range is considered.

Herein, the term "(meth)acryl" refers to acryl and/or methacryl.

A liquid crystal display device according to one embodiment of the invention may include a high color gamut light source; a liquid crystal panel; and a polarizing plate disposed at a viewer side of the liquid crystal panel, wherein the polarizing plate may include a polarizer and a polarizer protective film. The polarizer protective film may include a polyester base film having an in-plane retardation of 8,000 nm or more at a wavelength of 550 nm and a primer layer formed on at least one surface of the polyester base film, and may further include a coating layer formed on one surface of the primer layer and having a lower refractive index than the primer layer. Accordingly, the liquid crystal display device according to this embodiment employs a high color gamut light source to improve image quality and light use efficiency while preventing rainbow mura from being visible or increasing a side angle at which rainbow mura can first be viewed. For example, the liquid crystal display device according to this embodiment may have a side angle of 62° or more, preferably 62° to 70°, for example, 62°, 63°, 64°, 65°, 66°, 67°, 68°, 69°, or 70°, at which rainbow mura can first be viewed. Herein, the "viewer side" refers to a side opposite to the high color gamut light source with respect to a liquid crystal panel, that is, a screen side of the liquid crystal display device.

The polarizing plate will be described with reference to FIG. 1. FIG. 1 is a sectional view of a polarizing plate according to one embodiment of the invention.

Referring to FIG. 1, a polarizing plate 100 according to one embodiment may include a polarizer 110 and a polarizer protective film 120.

Upon receiving light from the liquid crystal panel, the polarizer 110 polarizes the light and emits the polarized light toward the polarizer protective film 120. The polarizer 110 may include a typical polarizer known to those skilled in the art. Specifically, the polarizer may include a polyvinyl alcohol polarizer obtained by uniaxially stretching a polyvinyl alcohol film, or a polyene-based polarizer obtained by dehydrating a polyvinyl alcohol film. The polarizer 110 may have a thickness of 5 μm to 40 μm, for example, 5 μm, 10 μm, 15 μm, 20 μm, 25 μm, 30 μm, 35 μm, or 40 μm. Within this range, the polarizer can be used in the liquid crystal display device.

The polarizer protective film 120 may be formed on the polarizer 110 to protect the polarizer 110. The polarizer protective film 120 may include a polyester base film 121, a primer layer 122, and a coating layer 123. The polarizer protective film 120 may have a stack structure in which the polyester base film 121, the primer layer 122, and the coating layer 123 are sequentially stacked from the polarizer 110.

The polyester base film 121 may be formed on the polarizer 110 to protect the polarizer 110.

The polyester base film 121 may be a stretched retardation film. When used as the stretched retardation film, the polyester base film 121 can suppress visibility of rainbow mura by some degree in use of the light source having a high color gamut. When the polyester base film is formed of a non-stretched film, there can be a problem of significant rainbow mura in use of the high color gamut light source due to birefringence of the polyester base film.

The polyester base film 121 may have an in-plane retardation of 8,000 nm or more at a wavelength of 550 nm, specifically an in-plane retardation of 8,000 nm or more, greater than 8,000 nm, 8,100 nm or more, 10,000 nm or more, 10,100 nm to 15,000 nm, for example, 10,100 nm, 10,500 nm, 11,000 nm, 11,500 nm, 12,000 nm, 12,500 nm, 13,000 nm, 13,500 nm, 14,000 nm, 14,500 nm, or 15,000 nm. Within this range, the polyester base film 121 can prevent rainbow mura from being visible, minimize a difference in retardation depending upon wavelength, and suppress generation of the rainbow mura. The polyester base film 121 is a uniaxially stretched film and may be formed, for example, by uniaxially stretching a polyester film to three to ten times an initial length thereof in the transverse direction (TD), followed by crystallization and thermal stabilization of the base film through tension-relaxation. Tension-relaxation may include a process of stretching the polyester base film to a TD elongation of greater than 0 to 3 times, specifically 0.1 to 2 times, 0.1 to 1 times, at a high temperature of 100° C. to 300° C. for 1 second to 2 hours.

The polyester base film 121 may have an out-plane retardation of 15,000 nm or less at a wavelength of 550 nm, specifically an out-plane retardation of 3,000 nm to 15,000 nm, 5,000 nm to 15,000 nm, 8,000 nm to 12,000 nm, 9,000 nm to 12,000 nm, for example, 9,000 nm, 9,500 nm, 10,000 nm, 10,500 nm, 11,000 nm, 11,500 nm, or 12,000 nm. Within this range, the polyester base film 121 can prevent rainbow mura from being visible and minimize a difference in retardation depending upon wavelength. The polyester base film 121 may have a degree of biaxiality of 1.8 or less at a wavelength of 550 nm, preferably 1.1 to 1.8, 1.2 to 1.8, or 1.3 to 1.8, for example, 1.3, 1.4, 1.5, 1.6, 1.7, or 1.8. Within this range, the polyester base film 121 can prevent the rainbow mura from being visible and minimize a difference in retardation depending upon wavelength.

The polyester base film 121 may not have nx and ny values of less than 1.65 or nx and ny values of 1.65 or more at the same time at a wavelength of 550 nm and thus does not generate rainbow mura due to birefringence resulting from variation of retardation depending upon incident angle and wavelength of light when used as the polarizer protective film. In one embodiment, the polyester base film may have an nx value of 1.65 or more, specifically 1.67 to 1.75, and an ny value of 1.45 to 1.55. In another embodiment, the polyester base film may have an ny value of 1.65 or more, specifically 1.67 to 1.72, more specifically 1.69 to 1.72, and an nx value of 1.45 to 1.55. Here, an absolute value (|nx−ny|) of a difference between nx and ny may be set to 0.1 to 0.2, specifically 0.12 to 0.18, for example, 0.12, 0.13, 0.14, 0.15, 0.16, 0.17, or 0.18, in order to improve viewing angle while preventing generation of rainbow mura.

The polyester base film 121 may have a refractive index of 1.3 to 1.7, specifically 1.4 to 1.6, 1.5 to 1.7, or 1.5 to 1.6, for example, 1.5, 1.51, 1.52, 1.53, 1.54, 1.55, 1.56, 1.57, 1.58, 1.59, or 1.6. Within this range, the polyester base film can be used as a base film of the polarizer protective film, facilitates control of the refractive index with the primer layer, and can improve transmittance of the polyester base film.

The polyester base film 121 may be formed of an optically transparent polyester resin. Specifically, the resin may include at least one of polyethylene terephthalate, polyethylene naphthalate, polybutylene terephthalate, and polybutylene naphthalate. The polyester base film 121 may have a thickness of 25 µm to 500 µm, preferably 25 µm to 200 µm, for example, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, 125 µm, 130 µm, 135 µm, 140 µm, 145 µm, 150 µm, 155 µm, 160 µm, 165 µm, 170 µm, 175 µm, 180 µm, 185 µm, 190 µm, 195 µm, or 200 µm. Within this range, the polyester base film can be used in the polarizer protective film.

The primer layer 122 is formed on the polyester base film 121 to improve adhesion of the polyester base film 121 such that the polarizer 120 or the coating layer 123 can be efficiently bonded thereto. The primer layer 122 is directly formed on the polyester base film 121. The triacetylcellulose film can be efficiently bonded to the polarizer even without the primer layer, whereas the polyester base film is not efficiently bonded to the polarizer. Thus, the polyester base film may be modified by the primer layer so as to be efficiently bonded to the polarizer.

The primer layer 122 may have a refractive index of 1.0 to 1.6, specifically 1.1 to 1.6, 1.2 to 1.6, 1.3 to 1.6, 1.4 to 1.6, or 1.5 to 1.6, for example, 1.5, 1.51, 1.52, 1.53, 1.54, 1.55, 1.56, 1.57, 1.58, 1.59, or 1.6. Within this range, the primer layer can be used in an optical film and can have a suitable refractive index as compared to a base film to improve transmittance of the polarizer protective film. The primer layer may have a thickness of 1 nm to 200 nm, specifically 60 nm to 200 nm, for example, 60 nm, 70 nm, 80 nm, 90 nm, 100 nm, 110 nm, 120 nm, 130 nm, 140 nm, 150 nm, 160 nm, 170 nm, 180 nm, 190 nm, or 200 nm. Within this range, the primer layer can be used in an optical film, can have a suitable refractive index as compared to a base film to improve transmittance of the polarizer protective film, and can prevent brittleness of the polarizer protective film.

The primer layer 122 may be a non-urethane based primer layer free from a urethane group. Specifically, the primer layer may be formed of a composition for the primer layer including a resin or a monomer, such as polyester, an acrylic resin, and the like. The primer layer may have a refractive index as set forth above by controlling the mixing ratio (for example, mole ratio) of these monomers. The composition for the primer layer may further include at least one of a UV absorbent, an antistatic agent, a defoamer, a surfactant, and the like.

Although FIG. 1 shows the structure wherein the primer layer 122 is formed on one surface of the polyester base film 121, the primer layers 122 may be formed on both surfaces of the polyester base film 121 in other embodiments.

The coating layer 123 may be formed on the primer layer 122 to protect the polarizer 110. The coating layer 123 may be formed on a light exit surface of the primer layer 122 to allow light having sequentially passed through the polyester base film 121 and the primer layer 122 to pass therethrough. The coating layer 123 is directly formed on the primer layer 122.

Although the coating layer 123 has a lower refractive index than the primer layer 122, the coating layer 123 is thicker than the primer layer 122. With this structure, the coating layer 123 can prevent rainbow mura from being visible while allowing light emitted from the high color gamut light source and having sequentially passed through the polyester base film 121 and the primer layer 122 to pass therethrough. The coating layer 123 may have a refractive index of 1.0 to 1.6, specifically 1.30 to 1.47, more specifically 1.30 to 1.45, for example, 1.30, 1.31, 1.32, 1.33, 1.34, 1.35, 1.36, 1.37, 1.38, 1.39, 1.40, 1.41, 1.42, 1.43, 1.44, or 1.45. The coating layer 123 may have a thickness of 1.0 µm to 10.0 µm, specifically 3.0 µm to 7.0 µm, for example, 3.0 µm, 3.5 µm, 4.0 µm, 4.5 µm, 5.0 µm, 5.5 µm, 6.0 µm, 6.5 µm, or 7.0 µm. Within this range, the polarizer protective film can prevent the rainbow mura from being visible even in use of the high color gamut light source. In particular, since a low refractivity layer included in an anti-reflection film typically has a thickness of less than 1 µm, the polarizing plate including the anti-reflection film exhibits insignificant improvement in suppression of rainbow mura.

The coating layer 123, the primer layer 122, and the polyester base film 121 may satisfy the following Formula 4. Within this range, the polarizer protective film can prevent the rainbow mura from being visible even in use of the high color gamut light source and a polyester base film stretched at high elongation and having high retardation.

$$n1 < n2 \leq n3 \qquad \text{<Formula 4>}$$

where n1 is the refractive index of the coating layer, n2 is the refractive index of the primer layer, and n3 is the refractive index of the polyester base film.

The coating layer 123, the primer layer 122, and the polyester base film 121 may satisfy the following Formula 5. Within this range, the polarizer protective film has high mechanical strength and can prevent the rainbow mura from being visible even in use of the high color gamut light source and the polyester base film stretched at high elongation and having high retardation.

$$T2 < T1 < T3 \qquad \text{<Formula 5>}$$

where T1 is the thickness of the coating layer, T2 is the thickness of the primer layer, and T3 is the thickness of the polyester base film.

The coating layer 123 may be formed of a composition for the coating layer capable of realizing a refractive index within the above range. For example, the composition for the coating layer may include a monomer or an oligomer thereof, which has a refractive index 1.5 or less at a wavelength of 589 nm, for example, a refractive index of 1.2 to 1.6, 1.3 to 1.6, 1.2, 1.3, 1.4, 1.5, or 1.6, and an initiator. The composition for the coating layer may further include a predetermined amount of a monomer or an oligomer thereof, which has a refractive index of greater than 1.6, so long as the presence of the monomer or the oligomer does not affect the refractive index of the coating layer. In addition, the composition for the coating layer may further include silicon-based additives, fluorine-based additives, and the like. The monomer or the oligomer thereof may include a (meth) acrylic monomer, an epoxy monomer, or an oligomer thereof, without being limited thereto.

The polarizer protective film 120 may have a light transmittance of 80% or more in the visible range (for example, at a wavelength of 380 nm to 780 nm), specifically 85% to 95%, for example, 85%, 86%, 87%, 88%, 89%, 90%, 91%, 92%, 93%, 94%, or 95%. The polarizer protective film 120 may have a thickness of 50 µm to 200 µm, for example, 50

μm, 55 μm, 60 μm, 65 μm, 70 μm, 75 μm, 80 μm, 85 μm, 90 μm, 95 μm, 100 μm, 105 μm, 110 μm, 115 μm, 120 μm, 125 μm, 130 μm, 135 μm, 140 μm, 145 μm, 150 μm, 155 μm, 160 μm, 165 μm, 170 μm, 175 μm, 180 μm, 185 μm, 190 μm, 195 μm, or 200 μm. Within this range, the polarizer protective film can be used in the polarizing plate. The polarizer protective film 120 may have substantially the same properties as the polyester base film 121 in terms of in-plane retardation, out-of-plane retardation, and the degree of biaxiality.

The polarizing plate 100 may have a thickness of 150 μm to 400 μm, for example, 150 μm, 155 μm, 160 μm, 165 μm, 170 μm, 175 μm, 180 μm, 185 μm, 190 μm, 195 μm, 200 μm, 205 μm, 210 μm, 215 μm, 220 μm, 225 μm, 230 μm, 235 μm, 240 μm, 245 μm, 250 μm, 255 μm, 260 μm, 265 μm, 270 μm, 275 μm, 280 μm, 285 μm, 290 μm, 295 μm, 300 μm, 305 μm, 310 μm, 315 μm, 320 μm, 325 μm, 330 μm, 335 μm, 340 μm, 345 μm, 350 μm, 355 μm, 360 μm, 365 μm, 370 μm, 375 μm, 380 μm, 385 μm, 390 μm, 395 μm, or 400 μm. Within this range, the polarizing plate can be used in an optical display.

Although not shown in FIG. 1, an adhesive layer may be interposed between the polarizer 110 and the polyester base film 121 to bond the polarizer to the polyester base film. The adhesive layer may include a typical adhesive (water-based or photocurable adhesive) known to those skilled in the art.

In addition, although not shown in FIG. 1, an optical film may be formed on the other surface of the polarizer 110. The optical film may provide a function of protecting the polarizer or an optical compensation function. The optical film may be formed of an optically transparent resin. The resin may include at least one selected from among polyester resins including polyethylene terephthalate (PET), polybutylene terephthalate, polyethylene naphthalate, polybutylene naphthalate, and the like, acrylic resins, cyclic olefin polymer (COP), cellulose ester resins including triacetylcellulose, polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide resins. The optical film may include films formed of these resins subjected to modification. Here, modification may include copolymerization, branching, crosslinking, and modification of molecular terminals, without being limited thereto.

Next, a polarizing plate according to another embodiment will be described with reference to FIG. 2. FIG. 2 is a sectional view of a polarizing plate according to another embodiment.

Referring to FIG. 2, a polarizing plate 200 according to another embodiment is substantially identical to the polarizing plate 100 according to the above embodiment except for a polarizer protective film 120' which further includes a functional layer 124 on a coating layer 123. The functional layer 124 can provide an additional function to the polarizing plate.

The functional layer 124 may have at least one function selected from among anti-reflection, low reflection, hardcoating, anti-glare, anti-fingerprint, anti-contamination, diffusion and refraction functions. Preferably, the functional layer 124 includes a hardcoating layer. In the polarizing plate according to the present invention, the primer layer and the coating layer have low hardness and thus can provide a problem when used at the outermost periphery of the liquid crystal display device. Accordingly, the hardcoating layer is added as the functional layer. Here, the hardcoating layer may have a thickness of less than 1 μm, preferably greater than 0 μm to 950 nm or less and may have a refractive index of 1.40 to 1.58, for example, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, or 1.58, to prevent rainbow mura from being visible.

The hardcoating layer may compensate for a hardcoating function with respect to the primer layer and the coating layer.

The high color gamut light source may be disposed below the liquid crystal panel and supply light to drive the liquid crystal display device.

The high color gamut light source may have a color gamut of about 95% or more, specifically about 95% to about 120%, for example, about 95%, 96%, 97%, 98%, 99%, 100%, 101%, 102%, 103%, 104%, 105%, 106%, 107%, 108%, 109%, 110%, 111%, 112%, 113%, 114%, 115%, 116%, 117%, 118%, 119%, or 120%, by NTSC (national television system committee) or s-RGB in the CIE 1031 x, y, chromaticity diagram. Within this range, the light can improve image quality and light use efficiency of the liquid crystal display device.

In one embodiment, the high color gamut light source may include at least one of a quantum dot light source and a metal fluoride-based red phosphor-containing light source. As the metal fluoride-based red phosphor-containing light source, a KSF ($K_2SiF_6:Mn^{4+}$) phosphor or KTF ($K_2TiF_6:Mn^{4+}$) phosphor-containing light source may be used. Specifically, the quantum dot light source may be a Cd-free light source. FIG. 3 is a graph depicting intensity of light depending upon wavelength of light emitted from a high color gamut light source according to one embodiment of the present invention. FIG. 4 is a graph depicting intensity of light depending upon wavelength of light emitted from a KSF phosphor-containing light source according to another embodiment of the present invention. FIG. 5 is a graph depicting intensity of light depending upon wavelength of light emitted from a YAG phosphor-containing white light source in the related art. As shown in FIG. 5, light emitted from the YAG phosphor-containing white light source in the related art exhibits the maximum luminous peak in the wavelength range of 400 nm to 450 nm, from which the intensity of the light continues to decrease. However, as shown in FIG. 3 and FIG. 4, light emitted from the high color gamut light source exhibits the maximum luminous peaks in the blue wavelength range including 400 nm to 500 nm, in the green wavelength range including 500 nm to 600 nm, and in the red wavelength range including 600 nm to 700 nm.

The liquid crystal panel allows transmission of light received from the high color gamut light source to the polarizing plate therethrough. The liquid crystal panel may include a first substrate, a second substrate, and a liquid crystal layer secured between the first and second substrates. The liquid crystal panel may employ a vertical alignment (VA) mode, a patterned vertical alignment (PVA) mode or a super-patterned vertical alignment (S-PVA) mode, without being limited thereto.

The liquid crystal display device may further include a polarizing plate disposed at an opposite side to the viewer side with respect to the liquid crystal panel, that is, between the liquid crystal panel and the high color gamut light source. The polarizing plate may include a typical polarizing plate well known to those skilled in the art.

The liquid crystal display device may further a light guide plate, a reflective plate, and an optical sheet, which are typically used in the liquid crystal display device. Details of the light guide plate, the reflective plate, and the optical sheet are well known to those skilled in the art.

Next, the present invention will be described in more detail with reference to some examples. It should be understood that these examples are provided for illustration only and are not to be in any way construed as limiting the present invention.

Example 1

A polyvinyl alcohol film (thickness: 30 μm, degree of polymerization: 2,400, degree of saponification: 99.0%, VF-PE3000, Nippon Kuraray Co., Ltd.) was swollen in an aqueous solution at 25° C. and dyed in a dyeing bath containing iodine ions at 30° C. while stretching the polyvinyl alcohol film. The dyed polyvinyl alcohol film was additionally stretched to a final elongation of 6 times an initial length thereof in a boric acid solution at 55° C. The resultant polyvinyl alcohol film was dried in a chamber at 50° C. for 3 minutes, thereby preparing a polarizer (thickness: 12 μm).

A composition for formation of a primer layer was coated on both surfaces of a polyethylene terephthalate film (Re: 8,300 nm, Rth: 9,300 nm, NZ: 1.58 at a wavelength of 550 nm, thickness: 80 μm, refractive index: 1.58, manufacturer: TOYOBO, Product Name: TA044) and dried to form a primer layer (thickness: 90 nm, refractive index: 1.52). Retardation of the polyethylene terephthalate was measured at a wavelength of 550 nm using an Axoscan polarimeter (AxoMetric Co., Ltd.).

A composition comprising the components in amounts (unit: parts by weight) as listed in Table 1 was mixed with methylethylketone in the same parts by weight and stirred to prepare a composition for coating layers. The prepared composition was coated to a thickness of 3.0 μm on one surface of the primer layer using a bar coater and dried in a drying oven at 85° C. for 1 minute to remove methylethylketone, followed by exposure at 800 mJ/cm² using a metal halide lamp to form a coating layer (thickness: 3.0 μm, Refractive index: 1.362), thereby preparing a polarizer protective film.

The prepared polarizer protective film was bonded to one surface of the prepared polarizer via a bonding layer such that the coating layer was placed at the outermost side, and a cycloolefin polymer film (Zeon Co., Ltd.) was bonded to the other surface of the polarizer via a bonding layer, thereby preparing a polarizing plate. Each of the bonding layers had a thickness of 2 μm and was formed using a UV curable bonding agent.

In a TV model (Sharp Model LC52US30) including a KSF light source (color gamut: 95% by NTSC) as a high color gamut light source and a liquid crystal panel, the prepared polarizing plate was placed at a viewer side of the liquid crystal panel such that the coating layer was placed at the uppermost side (viewer side) and a polarizing plate provided to the TV model was placed at an opposite side to the viewer side of the liquid crystal panel.

When the front side, the left end, and the right end were defined as 0°, 90°, and 90° with respect to the viewer side of the liquid crystal panel, respectively, an initial angle at which rainbow mura was first observed while a viewer moved from the front side to the left or the right during operation of the light source is shown in Table 1.

Examples 2 to 5

Each specimen was prepared in the same manner as in Example 1 except that the composition of the coating layer was changed as listed in Table 1 to change the refractive index of the coating layer, and an initial angle at which rainbow mura was first observed in the same manner as in Example 1 is shown in Table 1.

Comparative Example 1

A specimen was prepared in the same manner as in Example 1 except that the coating layer was not formed, and an initial angle at which rainbow mura was first observed in the same manner as in Example 1 is shown in Table 1.

Comparative Examples 2 to 3

Each specimen was prepared in the same manner as in Example 1 except that the composition of the coating layer was changed as listed in Table 1 to change the refractive index of the coating layer, and an initial angle at which rainbow mura was first observed in the same manner as in Example 1 is shown in Table 1.

Comparative Example 4

A specimen was prepared in the same manner as in Example 1 except that a polyethylene terephthalate film (Re: 3,300 nm, Rth: 9,800 nm and NZ: 2.8 at a wavelength of 550 nm, thickness: 100 μm, refractive index: 1.64, manufacturer: TOYOBO, Product Name: A4300) was used instead of the polyethylene terephthalate film, and an initial angle at which rainbow mura was first observed in the same manner as in Example 1 is shown in Table 1.

TABLE 1

| Component | Refractive index[1] | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| HRI-85 | 1.646 | — | — | — | — | — | — | 40 | — | — |
| TRD-800PB | 1.604 | — | — | — | — | — | — | 30 | — | — |
| PP-011 (OPPEA) | 1.575 | — | — | — | — | — | — | — | 30 | — |
| M1122 (PBA) | 1.566 | — | — | — | — | 20 | — | 10 | 40 | — |
| M600 (DPHA) | 1.488 | 20 | 40 | 50 | 65 | 50 | — | 20 | 15 | 20 |
| OF-136 | 1.369 | — | — | — | 25 | 20 | — | — | 15 | — |
| OF-135 | 1.357 | 10 | 20 | 30 | — | — | — | — | — | 10 |

TABLE 1-continued

| Component | Refractive index[1] | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| MY-132 | 1.324 | 10 | 30 | 20 | 10 | 10 | — | — | — | 10 |
| MY-131 | 1.314 | 60 | 10 | — | — | — | — | — | — | 60 |
| BYK UV-3530 | 1.457 | 0.5 | 0.5 | 0.5 | 0.5 | 0.5 | — | 0.5 | — | 0.5 |
| TPO | 1.6 | 3 | 3 | 3 | 3 | 3 | — | 3 | 3 | 3 |
| Refractive index[2] of coating layer | | 1.362 | 1.401 | 1.421 | 1.444 | 1.467 | — | 1.593 | 1.529 | 1.362 |
| Refractive index[3] of primer layer | | 1.52 | 1.52 | 1.52 | 1.52 | 1.52 | 1.52 | 1.52 | 1.52 | 1.52 |
| In-plane retardation of polyester base film (nm) | | 8300 | 8300 | 8300 | 8300 | 8300 | 8300 | 8300 | 8300 | 3300 |
| Initial angle for observation of rainbow mura (°) | | 67.5 | 65 | 63 | 62 | 62 | 59 | 58 | 60 | 30 | refractive index[1]: refractive index of the corresponding component at a wavelength of 633 nm.
refractive index[2] of coating layer: refractive index of coating layer at a wavelength of 633 nm.
refractive index[3] of primer layer: refractive index of primer layer at a wavelength of 633 nm.
HRI-85: Daelim Chemical Co., Ltd.;
TRD-800PB: Shin-A TNC Co., Ltd.;
PP-011, M1122, M600: Miwon Specialty Chemical Co., Ltd.;
OF-136, OF-135, MY-132, MY-131: My Polymers Ltd.;
BYK UV-3530, TPO: BASF.

As shown in Table 1, the liquid crystal display devices according to the present invention had much higher angles at which rainbow mura was first observed, even with a high color gamut light source and a polyester base film having high retardation.

It should be understood that various modifications, changes, alterations, and equivalent embodiments can be made by those skilled in the art without departing from the spirit and scope of the present invention.

The invention claimed is:

1. A liquid crystal display device comprising: a high color gamut light source; a liquid crystal panel; and a polarizing plate disposed at a viewer side of the liquid crystal panel, wherein the polarizing plate comprises a polarizer and a polarizer protective film,
the polarizer protective film comprising: a polyester base film having an in-plane retardation of 8,000 nm or more at a wavelength of 550 nm, as represented by Equation 1; a primer layer formed on at least one surface of the polyester base film; and a coating layer formed on one surface of the primer layer and having a lower refractive index than the primer layer:

$$Re = (nx - ny) \times d \qquad \text{<Equation 1>}$$

where nx and ny are refractive indices in the slow axis and fast axis directions of the polyester base film at a wavelength of 550 nm, respectively, and d is a thickness of the polyester base film (unit: nm),
the polyester base film has an out-plane retardation of 15,000 nm or less at a wavelength of 550 nm, as represented by Equation 2:

$$Rth = ((nx + ny)/2 - nz) \times d \qquad \text{<Equation 2>}$$

where nx, ny and nz are the refractive indices of the polyester base film in the slow axis, fast axis, and thickness directions thereof at a wavelength of about 550 nm, respectively, and d is the thickness of the polyester base film (unit: nm), and
the polyester base film has a degree of biaxiality of 1.8 or less at a wavelength of 550 nm, as represented by Equation 3:

$$NZ = (nx - nz)/(nx - ny) \qquad \text{<Equation 3>}$$

where nx, ny and nz are the refractive indices of the polyester base film in the slow axis, fast axis, and thickness directions thereof at a wavelength of about 550 nm, respectively.

2. The liquid crystal display device according to claim 1, wherein the high color gamut light source has a color gamut of 95% or more by the National Television System Committee (NTSC) in a CIE 1031 x, y, chromaticity diagram.

3. The liquid crystal display device according to claim 1, wherein the high color gamut light source comprises at least one of a quantum dot light source and a metal fluoride-based red phosphor-containing light source.

4. The liquid crystal display device according to claim 3, wherein the metal fluoride-based red phosphor-containing light source comprises KSF ($K_2SiF_6:Mn^{4+}$) phosphors or KTF ($K_2TiF_6:Mn^{4+}$) phosphors.

5. The liquid crystal display device according to claim 1, wherein the coating layer is thicker than the primer layer.

6. The liquid crystal display device according to claim 1, wherein the coating layer, the primer layer, and the polyester base film satisfy Formulas 4 and 5:

$$n1 < n2 \leq n3 \qquad \text{<Formula 4>}$$

where n1 is a refractive index of the coating layer, n2 is a refractive index of the primer layer, and n3 is a refractive index of the polyester base film;

$$T2 < T1 < T3 \qquad \text{<Formula 5>}$$

where T1 is a thickness of the coating layer, T2 is a thickness of the primer layer, and T3 is a thickness of the polyester base film.

7. The liquid crystal display device according to claim 1, wherein the coating layer has a refractive index of 1.0 to 1.6 and the coating layer has a thickness of 1.0 μm to 10.0 μm.

8. The liquid crystal display device according to claim 1, wherein the primer layer has a refractive index of 1.0 to 1.6 and a thickness of 1 nm to 200 nm.

9. The liquid crystal display device according to claim 1, wherein the polyester base film has a refractive index of 1.3 to 1.7.

10. The liquid crystal display device according to claim 1, wherein the polyester base film is formed of a composition comprising at least one of polyethylene terephthalate, polyethylene naphthalate, polybutylene terephthalate, and polybutylene naphthalate.

11. The liquid crystal display device according to claim 1, wherein a functional layer is further formed on one surface of the coating layer.

12. The liquid crystal display device according to claim 11, wherein the functional layer has at least one function selected from among anti-reflection, low reflection, hard-coating, anti-glare, anti-fingerprint, anti-contamination, diffusion and refraction functions.

\* \* \* \* \*